United States Patent Office 3,702,316
Patented Nov. 7, 1972

3,702,316
COLD BOX METHOD
Janis Robins, St. Paul, Minn., assignor to Ashland
Oil Inc., Houston, Tex.
No Drawing. Continuation-in-part of application Ser. No.
72,113, Sept. 14, 1970, which is a continuation-in-part
of application Ser. No. 723,873, Apr. 24, 1968, which
in turn is a continuation-in-part of applications Ser. No.
569,106, Aug. 1, 1966, now Patent No. 3,429,848, and
Ser. No. 536,180, Mar. 14, 1966, now Patent No.
3,485,797. This application Jan. 26, 1971, Ser. No.
109,946
Int. Cl. B22c 15/24
U.S. Cl. 260—38
6 Claims

ABSTRACT OF THE DISCLOSURE

An improvement in cold box foundry core production methods in which a phenolic/isocyanate binder is cured with an organic base catalyst having a $pK_b$ value ranging from about 7-11.

RELATED APPLICATIONS

This application is a continuation-in-part of the following prior applications: Ser. No. 72,113, filed Sept. 14, 1970, which is in turn a continuation-in-part of Ser. No. 723,873, filed Apr. 24, 1968, which is in turn a continuation-in-part of Ser. No. 569,106, filed Aug. 1, 1966, which is now Pat. 3,429,848, and is also a continuation-in-part of Ser. No. 536,180, filed Mar. 14, 1966, which is now Pat. 3,485,797.

BACKGROUND

To attain rapid mass production of foundry cores a high speed mixer is charged with the amount of sand and binder required for a single core as well as a relatively large quantity of fast acting hardening catalyst such as para toluene sulfonic acid. The resultant mixture is subjected to tumultuous mechanical agitation for a short mixing period measured in seconds, following which it is immediately discharged from the mixer into a core mold. Because of the relatively large quantity of active catalyst employed, the mix sets fast enough to be discharged from the mold in less than a minute, and often in as short a period as 20 to 40 seconds. The operation as above described can be carried on continuously, and it is of course possible to use the mixer to feed mixed sand and binder to a plurality of core molds.

One example of such methods is the Gisag Cold Box Method. The method may be practiced in machinery having storage bins and tanks for sand, catalyst and binder, proportioning type feeding means leading from the storage containers to the high speed mixer, a "shooting head" connected through valve means to the mixer outlet for filling core molds, and an automatic control system for controlling the sequence and duration of operation of the foregoing machinery components.

The large quantities of catalyst employed in the above-mentioned type of method pose certain problems. Firstly, they can initiate curing of the sand and binder during mixing, thus creating a "stickiness" in the mix which impedes uniform mixing. This can in turn lead to cores of non-uniform strength properties. Secondly, the mere presence of residual catalyst in the cured core (even if well mixed) tends to degrade its physical properties, due to a kind of "plasticizing" effect. The more catalyst one uses to reduce the delay in hardening of the mix in the core mold, the more pronounced either or both of these problems become.

BRIEF SUMMARY OF THE INVENTION

The present invention reduces the foregoing problems by carrying out the above method with particular phenolic resins and particular catalysts having $pK_b$ values in a specified range which, when used in combination, have been found to behave in an unexpected way which yields particular benefits in such cold box methods. More particularly, in the presence of small amounts of catalysts having the specified $pK_b$ values, the specified resins initially react relatively slowly or not at all with isocyanate for a controllable time period, following which there is a definite and rapid increase in the rate of reaction leading to complete cure in a short time period which compares favorably with the cure times obtained with the catalysts previously employed in such methods. This phenomenon is of definite assistance in the above-described type of cold box methods in that the sand, binder and catalyst can be mixed during the slow- or no-reaction phase of the catalyst's activity, so that incipient curing and stickiness of the mix is reduced or eliminated during the mixing step. On the other hand, the catalyst, resin, isocyanate combination exhibits a fast enough rate of reaction during the reactive phase of the catalyst's activity so that the mix need not be loaded up with excessive amounts of catalyst in order to attain a short setting time in the mold. The duration of the low- or no-reactivity phase has been found to be selectively controllable by varying the amount of a given catalyst being used. This in turn permits an optimized form of the improved cold box method wherein the low-reactivity phase is controlled to continue substantially throughout the major or entire portion of the mixing cycle, whereby uniform mixing can be obtained in the shortest possible time, and the fast reactivity phase is timed to begin at substantially the same time the mix enters the core mold.

The phenolic resins employed in the present invention are characterized by containing one or more units having the formula:

(I) 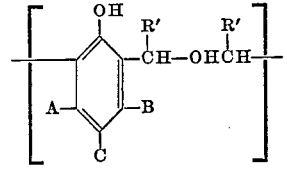

wherein A, B, and C are hydrogen, hydrocarbon radicals, oxyhydrocarbon radicals or halogen, R' is individually a hydrogen or a hydrocarbon radical of 1 to 8 carbon atoms. The resins have average degrees of polymerization, as measured by the number of repeating aromatic rings, of 3 to 100, and preferably about 4 to 10. Although higher molecular weight resins are operable in the curing reactions above described such resins are difficult to handle from the standpoint of viscosity.

The described benzylic ether resins are condensation polymers of a phenol having the general formula:

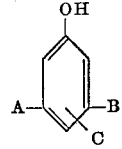

wherein A, B and C are hydrogen, hydrocarbon radicals, oxyhydrocarbon radicals, or halogen, with an aldehyde having the general Formula R'CHO wherein R' is a hydrogen or a hydrocarbon radical of 1 to 8 carbon atoms, prepared in the liquid phase in the substantial absence of water at temperatures below about 130° C. in the presence of catalytic concentrations of a metal ion dissolved in the reaction medium. The molar ratio of aldehyde to phenol can generally be varied from 3:1 to 1:1, although some resin is also formed outside these ratios. The preparation and characterization of these resins is disclosed in greater detail in the above-mentioned application Ser. No. 536,-180, filed Mar. 14, 1966, now U.S. Pat. No. 3,485,797. In the preferred form, these resins have the general formula:

(III)

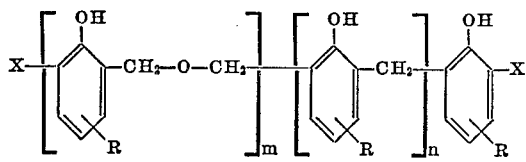

wherein R is a hydrogen or a phenolic substituent meta to the phenolic hydroxyl group, the sum of $m$ and $n$ is at least 2 and the ratio of $m$-to-$n$ is at least 1, and X is an end-group from the group consisting of hydrogen and methylol, the molar ratio of said methylol-to-hydrogen end-groups being at least 1.

The most preferred benzylic ether resins employed in the resin compositions of the present invention are those in which R is hydrogen. The phenols employed in the formation of the benzylic ether resins are generally all phenols which have heretofore been employed in the formation of phenolic resins generally, and which are not substituted at either of the carbon atoms ortho to the hydroxyl group. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl substituted phenols, aryl-substituted phenols, cycloalkyl-substituted phenols, alkenyl-substituted phenols, alkoxy-substituted phenols, aryloxy-substituted phenols, and halogen-substituted phenols, the foregoing substituents containing from 1 to 26 and preferably from 1 to 6 carbon atoms. Specific examples of suitable phenols, aside from the preferred unsubstituted phenol, include: m-cresol, p-cresol, 3,5-xylenol, 3,4-xylenol, 3,4,5-trimethyl phenol, 3-ethyl phenol, 3,5-diethyl phenol, p-butyl phenol, 3,5-dibutyl phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the Formula R'CHO wherein R' is a hydrogen or a hydrocarbon radical of 1 to 8 carbon atoms. The most preferred aldehyde is formaldehyde.

The isocyanates useful in the present invention comprise aliphatic, cycloaliphatic or aromatic polyisocyanates having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4'-dicyclohexylmethane diisocyanate, and aromatic polyisocyanates such as 3,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylylene diisocyanate, and the methyl derivatives thereof, polymethylenepolyphenol isocyanates, chlorophenylene-2,4-diisocyanate, and the like. Although all polyisocyanates react with the described phenolic resin to form a cross-linked polymer structure, the preferred polyisocyanates are aromatic polyisocyanates and particularly diphenylmethane diisocyanate, triphenylmethane triisocyanate, complex commercially-available compositions containing polymeric isocyanates, sold under such trademarks as "PAPI," "Mondur MR" and "NCO–120" and mixtures thereof.

The polyisocyanate is employed in sufficient concentrations to cause the curing of the phenolic resin and other active hydrogen-containing materials when present. This refers to materials with hydrogen atoms which display activity according to the well-known Zerewitinoff method as described by Kohlen in JACS, 49, 3181 (1927). Thus, for example, phenol-formaldehyde resins of the Novolac and/or resole types having an average of two or more active hydrogen atoms per molecule may be employed. For information on Novolacs and resoles the disclosures of U.S. Pats. 3,242,107 and 3,409,571 and British Pats. 757,392 and 773,510 are hereby incorporated by reference to the extent pertinent. The total weight of such other active hydrogen-containing material should not exceed three times the weight of the benzylic ether resin and should preferably be less than that of the benzylic ether resin. In general, the polyisocyanate will be employed in a range of 10 to 500 weight percent of polyisocyanate based on the weight of the benzylic ether resin and other active hydrogen-containing materials. Preferably, from 20 to 300 weight percent of polyisocyanate on the same basis is employed. The polyisocyanate is employed in liquid form. Liquid polyisocyanates can be employed in undiluted form. Solid or viscous polyisocyanates are most conveniently employed in the form of organic solvent solutions, the solvent being present in a range of up to 80% by weight of the solution.

The catalysts employed in the practice of the present invention are bases having the $pK_b$ values in the range of about 7 to about 11. The $pK_b$ value is the negative logarithm of the dissociation constant of the base and is a well-known measure of the basicity of a basic material. The higher this number is, the weaker the base. The bases falling within this range are generally organic compounds containing one or more nitrogen atoms. Preferred materials are heterocyclic compounds containing at least one nitrogen atom in the ring structure. Specific examples of bases which have $pK_b$ values within the necessary range include 4-alkyl pyridines wherein the alkyl group has from 1 to 4 carbon atoms, isoquinoline, aryl-pyridines such as phenyl pyridine, pyridine, acridine, 2-methoxypyridine, pyridazine, 3-chloro pyridine, quinoline, N-methyl imidazole, 4,4-dipyridine, phenylpropyl pyridine, 1-methylbenzimidazole, and 1,4-thiazine.

In view of the varying catalytic activity and varying catalytic effect desired, catalyst concentrations will vary widely. In general the lower the $pK_b$ value is, the shorter will be the low reactivity interval of the composition and the faster, more complete will be the cure. Solvents and any acidity present in added ingredients each as sand may effect the catalytic activity. In general, however, catalyst concentrations will range from 0.01 to 10% by weight of the phenolic resin.

Commercially available core shooting machines such as the Gisag KCBS series require only simple modification for use in practising the invention in the most preferred manner. These machines are described in Invest Export's product circular Ag 01/040/70 III 27–769–3000–1185, entitled "Gisag-Cold-Box-Method Core Shooting Machine KS with Auxiliary Equipment KCBS" which is hereby incorporated herein by reference.

Such machines are vertically arranged with a shooting head, below which is a vertically reciprocating core box holder for raising core boxes or molds into position beneath the shooting head outlet. Above the shooting head is a high-speed rotary mechanical mixer with an electric motor capable of subjecting sand, binder and catalyst to tumultuous agitation. It has a slide-valve-controlled, normally closed outlet into the shooting head. A motorized horizontal screw conveyor is mounted with its outlet opening into the mixer and its pick-up section passing beneath a sand storage hopper at the top of the machine. Such machines are conventionally provided with a dosing tank for binding agent, which tank is charged with compressed air and discharges directly through a normally-closed solenoid valve and nozzle into the interior of the mixing chamber at the top. A switching cabinet supplied with the machine contains automatic controls for the opening and closing of the solenoid valve and the starting and stopping of the screw conveyor to automatically control the feeding or predetermined ratios of sand and binder to the mixer on command. Said ratios may be adjusted by suitably changing the period of operation of the conveyor motor and solenoid valve, the motor speed and the nozzle opening. The machine is also provided with an adjustable timer control for operating the mixer outlet valve and shooting head to eject the uniformly mixed sand and binder into the core box of mold at a predetermined time interval after the binder has been introduced into the sand. Normally the control sequence is arranged so that the sand enters the mixer first and is already under agitation as the binder enters. The predetermined mixing period referred to herein begins with the charging of the binder, and it is at the end of this period that the slide valve opens automatically to drop the mix into the shooting head from which it is automatically ejected by compressed air into the core box.

For purposes of carrying out the present invention in the preferred manner, the foregoing machines are most readily modified by installing a second dosing tank, normally closed solenoid valve and nozzle, opening into the upper part of the mixer. This provides the machine with first and second liquid dosing systems which can be used to simultaneously meter out separate predetermined quantities of "resin solution" containing the resin, catalyst and solvent, and "hardener solution" containing polyisocyanate and solvent. The first and second dosing systems are both readily operated by the controller normally supplied with the equipment by wiring their solenoid valves in parallel. The ratio of active ingredients charged each time the valves are opened may be predetermined by use of different nozzles and/or solvent ratios in the two systems.

Although the modified equipment as above described is preferred, the machines may also be used in the form in which they are normally suppled. In such case, the catalyst dissolved in solvent may be uniformly premixed with the sand before it is loaded into the sand hopper. A solvent solution of resin and polyisocyanate is fed from the single dosing tank supplied with the machine. It will be seen however that the preferred way of carrying out the invention has the advantage of avoiding the troublesome premixing of small amounts of catalyst with relatively large amounts of sand without incurring the problem of premature gellation of resin and isocyanate when droplets of the latter collide in the mixer prior to becoming uniformly mixed with the sand.

The work time (mixing time) and strip time (time in which the core may be removed from the core box) which are employed may be varied as desired by those using the process. However, for rapid operation, about 1–20 seconds is a representative work time, measured from the time the sand, binder and catalyst have all been brought together until they are injected into the core box. About 10 to 60 seconds is a representative strip time, measured from the time of injection of the uniform mix into the core box until it has become dimensionally stable and can be removed from the mold. Injection of the mix into the core box may take place prior to or slightly after the mix increases in cohesiveness (indicating transition from its low- or no-reactivity condition phase to its more rapid reactivity condition), provided the mix is then still in a fluent condition (has not set and is still sufficiently flowable to pass smoothly out of the mixer, through the core-shooter and into the core box). Thus, if injection does not take place prior to the aforesaid transition it should at least approximately coincide with said transition. However, for best results, the injection should slightly preceed the transition, thus reducing both work time and strip time as much as possible.

The invention will now be illustrated by the following non-limiting examples in which all parts are by weight unless the contrary is clearly indicated:

EXAMPLE 1

Into a sealed kettle was charged 62.5 lbs. of phenol, 46.5 lbs. of paraformaldehyde (91%) and 0.95 lb. of lead naphthenate (24% Pb). The vessel was sealed, heated and maintained at 120° C. to 130° C. for a period of two hours. During this heating period, the pressure was maintained at 2 to 4 p.s.i., and steam was released from the vessel as pressure increased. A total of about 20 lbs. of water was removed. After two hours, a vacuum was pulled on the reaction mixture to remove most of the residual water. The resin was of the benzylic ether type as defined in Formula III.

EXAMPLE 2

Using the resin of Example 1, the following resin and hardener solutions were made up:

Resin solution

| | Percent |
|---|---|
| Resin of Example 1 | 52 |
| Cellosolve acetate | 22 |
| Aromatic solvent | 25 |
| 1,3-di-4-pyridyl propane | 2 |

Hardener solution

| | Percent |
|---|---|
| Polyisocyanate | 80 |
| Aromatic solvent | 20 |

The aromatic solvent employed in the formulation of the solutions was commercially available "Bronoco Hi-Sol 96" having a boiling point range of 315 to 360° F. with a mixed aniline point of 57° F. The polyisocyanate was commercially available "Mondur MR." A Gisag KCBS 12 core shooting machine is employed, the machine being modified to provide two liquid dosing systems as described above. Wedron silica sand is charged to the sand hopper, and resin and hardener solutions are charged to the two liquid dosing tanks. The proportional feeders on the sand hopper, resin tank and hardener tank are set to feed sand, resin solution and hardener solution is a weight ratio of 500:5:5. The automatic sequencing and timing control is set to operate the mixer for 10 seconds after a charge enters and to automatically eject the mixed charge into a waiting core mold at the end of the mixing cycle.

Upon energizing the machine, a total of 120 parts of the sand and aforesaid solutions are automatically charged to the mixer via the feed screw. The mix is in a fluent condition and remains so for a period of about 25 seconds, indicating that during this period there is very slow or essentially no reaction between the resin and isocyanate. However, mixing and injection into the core mold take place automatically only 10 seconds after commencing mixing. After 15 seconds in the core mold, there is a noticeable increase in the cohesiveness of the mix indicating that it is transitioning to a condition of substantially more rapid reactivity. After a total of 50 seconds (10 seconds in the mixer and 40 in the mold), the core is dimensionally stable and is removed from the mold. During curing of the core in the mold, a second core mix is mixed in the same manner and ejected into a second mold. The operation is operated continuously.

EXAMPLE 3

Example 2 is repeated except that a like amount of N-methyl imidazole is substituted for the 1,3-di-4-pyridyl propane. The current consumption of the motor on the mixer increases during the last two seconds of the 10 second mixing period, indicating that the transition to rapid reactivity of the mix is taking place slightly before ejection into the core mold. After a total of 30 seconds (10 seconds mixing and 20 seconds in the mold) the dimensionally stable core is removed from the mold.

What is claimed is:

1. A method of producing foundry cores comprising: introducing into an enclosed mixing chamber sand, liquid binder comprising phenol-aldehyde resin having at least one benzylic ether linkage per molecule and sufficient polyisocyanate to cure the resin, and basic catalyst having a $pK_b$ value in the range of 7 to 11, the resulting mixture exhibiting relatively slow or no reactivity during a predetermined initial time interval during which said mixture remains in a fluent condition, followed by a transition to a substantially more rapid reactivity during a subsequent time interval during which said mixture rapidly develops cohesiveness and sets; uniformly mixing said sand, binder and catalyst by subjecting said mixture to tumultuous agitation with mechanical agitating means which operates on said mixture for a predetermined period of mixing in response to automatic control means connected with said agitating means; ejecting said mixture from said mixing chamber into a core mold in response to said automatic control means; and controlling the quantity of said catalyst introduced into said mixture, the length of said predetermined period of mixing and the time of injection of said mixture into said mold for causing said injection prior to or approximately at the time of said transistion.

2. Method in accordance with claim 1 wherein said mixture is injected into said mold in a fluent condition after the mix begins to increase in cohesiveness.

3. Method in accordance with claim 1 wherein said mixture is injected into said mold prior to said transition.

4. A method in accordance with claim 1 wherein the catalyst is N-methyl imidazole.

5. A method in accordance with claim 1, wherein the catalyst is pyridine or a derivative of pyridine.

6. A method in accordance with claim 1, wherein the catalyst is a 4-alkyl pyridine wherein the alkyl group has from 1 to 4 carbon atoms, isoquinoline, an aryl-pyridine, acridine, 2-methoxypyridine, 4,4-dipyridine or phenylpropyl pyridine.

References Cited
UNITED STATES PATENTS

| | | | |
|---|---|---|---|
| 3,409,579 | 11/1968 | Robins | 260—30.4 |
| 2,806,832 | 9/1957 | Drumm et al. | 260—Dig. 40 X |
| 2,374,136 | 4/1945 | Rothrock | 260—59 X |
| 3,428,110 | 2/1969 | Walker et al. | 260—Dig. 40 X |

OTHER REFERENCES

R. W. Lenz: Organic Chemistry of Synthetic High Polymers, Interscience, 1967, QD 281.P6L4, pp. 181–2.

B. A. Dombrow: Polyurethanes (2nd ed.), Reinhold, 1965. QD 305.A2D6, p. 21.

MORRIS LIEBMAN, Primary Examiner

S. M. PERSON, Assistant Examiner

U.S. Cl. X.R.

164—43; 260—Dig. 40